United States Patent Office 2,890,119
Patented June 9, 1959

2,890,119

METHOD OF PRESERVING FOOD PRODUCTS

Marcus W. Minkler, Chicago, Thomas W. Findley, La Grange, and Robert S. Geister, Palos Heights, Ill., assignors to Swift & Company, Chicago, Ill., a corporation of Illinois No Drawing. Application April 17, 1956
Serial No. 578,598

3 Claims. (Cl. 99—150)

The present invention relates to an improved antimicrobial agent especially suitable for the control of bacteria and fungi on products designed for human and animal consumption and to methods for using the improved antimicrobial agent.

There are available numerous agents for inhibiting the growth of microorganisms, but unfortunately most of these materials are unsuitable for use in connection with food products as the agent itself, or its by-product, may be toxic to mankind and animal. Among the agents that have been found to be effective against bacteria and fungi have been some of the epoxide compounds but unfortunately those epoxides which have been previously employed hydrolyze to glycols (saturated dihydroxy compounds). The presence of most glycols in food is viewed unfavorably by the various governmental bodies, and consequently the epoxides have not been widely used as antimicrobial agents in food.

It is an object of this invention to provide a bactericidal and fungicidal composition, the active ingredient of which hydrolyzes to form a non-toxic compound.

An additional object is to provide an improved process for inhibiting growth of bacteria and fungi in products designed for human and animal consumption which products contain some moisture.

We have discovered that 2,3, epoxy-1-propanol, more commonly known as glycidol, is an effective antibacterial and antimycotic agent in minor amounts. This epoxide may be used in connection with foods as it hydrolyzes in the presence of water to form glycerine, a non-toxic product which has been long used in both foods and drugs. Most foods, for example meat and other products, contain a relatively large quantity of moisture which will react with the epoxide compounds and hence it is critical that these hydrolyzable bactericides have hydrolysis products which are non-toxic and not objectionable when contained in foods. Glycidol has this critical property. Glycidol has proven to be an effective fungicide and bactericide at those temperatures at which the foods are commonly held.

The improved antimicrobial agent of our invention may be applied in several ways to foods and either in solutions or directly. Suitable liquids that may be used as carriers are water, glycerine, and various fats. The bactericidal composition may be applied to the surface of the food product in various ways as for example, by dipping the food in a solution containing glycidol or by painting or spraying. If desired, the antimicrobial composition of this invention may be mixed directly with the comminuted or finely divided food, e.g., ground meat. It is contemplated that since the active ingredient of the invention is liquid at room temperature, it may be packaged with a gas under pressure in a container, making it possible to use the agent in an aerosol form.

It has been our experience that glycidol is very effective in minor amounts and that it will completely inhibit the growth of fungi at levels of 0.4 percent based on the weight of the product treated. Good inhibition of the growth of fungi may be had with levels as low as 0.1 percent. As a bactericide, good inhibition may be had with levels of 0.75 percent, again based on the weight of the product, and total growth may be prevented with levels of 1.75 percent of glycidol. The foregoing proportions apply to glycidol mixed in comminuted foods and do not apply to instances where the surface of the food product is coated with the antimicrobial composition of this invention. Smaller amounts of glycidol may be employed but with decreasing efficiency.

The following charts strikingly demonstrate the advantages to be had in the use of glycidol as an antibacterial and antimycotic agent.

*Chart I*

| Percent Glycidol | F. Moliniformis (fungi) | Common Cheese Mold | Bacillus coli | Salmonella lexington | Bacillus subtilis | Salmonella senftenberg | Streptococcus | Bacillus cereus | Pseudomonas G. | Staphylococcus | Pseudomonas F. |
|---|---|---|---|---|---|---|---|---|---|---|---|
| 0.5 | − | − | − | + | + | +++ | +±++ | +++ | ++++ | ++++ | + |
| 0.75 | − | − | − | ± | − | + | + | ++ | +++ | +++ | + |
| 1.0 | − | − | − | − | − | − | ± | + | ++ | ++ | + |
| 1.25 | − | − | − | − | − | − | − | − | + | + | + |
| 1.5 | − | − | − | − | − | − | − | − | + | + | + |
| 1.75 | − | − | − | − | − | − | − | − | − | − | − |
| 2.0 | − | − | − | − | − | − | − | − | − | − | − |
| 2.5 | − | − | − | − | − | − | − | − | − | − | − |
| 3.0 | − | − | − | − | − | − | − | − | − | − | − |
| Control I | ++++ | ++++ | ++++ | ++++ | ++++ | ++++ | ++++ | ++++ | ++++ | ++++ | ++++ |
| Control II | − | − | − | − | − | − | − | − | − | − | − |
| Control III | − | − | − | − | − | − | − | − | − | − | − |

*Chart II*

| Percent Glycidol | Cheese Mold #7 | Cheese Mold #6 | Parchment Mold #34 | Trichoderma #38 | Fusarium #4 | Chaetonium #3 | Aspergillus niger #1 | Cheese Mold #H | Aspergillus Species #35 | Aspergillus Species #36 |
|---|---|---|---|---|---|---|---|---|---|---|
| 0.002 | ++++ | ++++ | ++++ | + | ++++ | +++ | + | ++++ | +++ | ++++ |
| 0.01 | ++++ | ++++ | ++++ | − | ++++ | +++ | + | +++ | ++ | +++ |
| 0.05 | + | + | + | − | ++++ | ++ | ± | ++ | + | + |
| 0.1 | − | − | ± | − | +±+ | − | ± | + | − | − |
| 0.2 | − | − | − | − | ± | − | − | ± | − | − |
| 0.4 | − | − | − | − | − | − | − | − | − | − |
| Control | ++++ | ++++ | ++++ | + | ++++ | ++++ | ++++ | ++++ | ++++ | ++++ |

In the experiments of the foregoing charts, 1 ml. of 24 hour broth cultures of the indicated bacteria were inoculated into approximately 12 ml. of sterile broth containing glycidol in the amounts shown. The pH of the sterile broth was 6.6 and the pH of the broth plus glycidol was approximately 6.8. The fungi were inoculated into potato-dextrose pour plates containing glycidol, the glycidol being at the levels stated in the preceding charts. The amount of glycidol in the instance of the bacterial experiments is on a volume basis of the sterile broth. For example, in the first line of Chart I the amount of glycidol used is 0.5 percent on a volume basis of the sterile broth. In the instance of the fungi experiments, the amount of glycidol used is again on a volume basis, based on the liquid potato-dextrose media.

It will be noted that control I of each experiment of Chart I shows four plus signs. In the instance of each of the microorganisms tested, control I of the experiment consisted of broth with no glycidol which broth was inoculated with the indicated microorganism. In all cases there was a heavy growth. Four plus signs stand for heavy growth; three plus signs for moderate growth; two plus signs for slight growth, and a single plus sign indicates that the growth of the bacteria or fungi is just detectable. In a few instances in the foregoing charts, a minus sign will appear below the plus signs; where this occurs the minus sign indicates that the particular rating is between the gradation indicated by the number of plus signs and a gradation having one less plus sign. The experiments of Chart I each have two controls in addition to the one described immediately above. Control II is a broth culture containing no added microorganisms and no glycidol and was performed to learn the sterility of the broth. In all the experiments it was demonstrated that the broth was sterile. Control III of each experiment was undertaken to determine whether the glycidol was contaminated or not with microorganisms and in each experiment 3 percent glycidol on a volume basis was added to the sterile broth. The glycidol, in all experiments, proved to be sterile. The samples of each experiment were held under refrigeration at 37° F. In the case of the bacterial experiments, observations were made at 2 days and 4 days. The observations recorded are those of the fourth day, although these observations did not differ greatly from the second day observations. In the case of the fungi, the observations recorded were made on the tenth day. Fungi observations were also made on the fourth day but here again the earlier observations did not differ appreciably from those recorded.

The experiments of Chart I contain two directed to fungi, which appear in the left-hand side of the chart. The rest of the chart is concerned with bacteria. Chart II pertains solely to fungi.

It will be noted that glycidol is somewhat more effective at the lower levels in combating fungi than bacteria. There was good inhibition of fungi growth where glycidol was used at a level of 0.1 percent on a volume basis (actually this can be considered for all practical purposes to be on a weight basis). There was complete inhibition of the growth of fungi when glycidol was employed in the amount of 0.4 percent. With respect to bacteria, there was good inhibition at levels of 0.75 percent and complete control of bacteria growth when the glycidol was used at 1.75 percent level. Glycidol prevents growth of coliform at the 0.5 percent level.

In another series of experiments two pounds of comminuted fresh meat were divided into four aliquots; the aliquots in turn were subdivided into 1-ounce patties. Four patties of one aliquot were used as controls and, one each of these patties was subjected to a bacterial analysis (1) at the outset of the experiment, (2) at 48 hours, (3) 5 days, and (4) 13 days. Patties from the second, third and fourth aliquots contained 0.1 percent, 0.5 percent, 1.0 percent glycidol respectively on a weight basis. Here, as in the instance of the control aliquot, one each of the patties of each aliquot was periodically examined at the times shown to obtain bacterial counts. The patties were placed in individual containers and refrigerated at a temperature within a range of 35° F.–40° F.

Chart III

| Time | Percent Glycidol | Bacterial Count | Organoleptic Observations |
|---|---|---|---|
| At outset of experiment. | Control | 2,780,000 | |
| | 0.1 | 1,750,000 | |
| | 0.5 | 1,370,000 | |
| | 1.0 | 1,230,000 | |
| 48 Hrs | Control | 14,800,000 | Dark Red, Meaty Odor. |
| | 0.1 | 8,900,000 | Red, Faint Sour Odor. |
| | 0.5 | 2,260,000 | Do. |
| | 1.0 | 390,000 | Greyish Red, Slight Medicinal Odor. |
| 5 Days | Control | 380,000,000 | Dark Red. |
| | 0.1 | 23,000,000 | Red. |
| | 0.5 | 540,000 | Greyish Red. |
| | 1.0 | <10,000 | Grey. |
| 13 days | Control | 202,000,000 | Dark Red, Slimy, Rotten Odor. |
| | 0.1 | 1,300,000 | Dark Red, Very Sour Odor. |
| | 0.5 | <1,000 | Grey, No Odor. |
| | 1.0 | <10 | Grey, Slight Medicinal Odor. |

The bacterial counts of the foregoing chart are expressed in total bacteria per gram. The red color of the control patties upon holding is typical of meat going rapidly sour, and is attributable to bacterial growth. The grey color of the glycidol treated samples is characterisic of meat which is aging in the absence of bacteria. An acceptable red color may be maintained in the glycidol treated samples by use of a suitable color stabilizer such as ascorbic acid.

The antimicrobial agent of this invention may be used in any of those settings where toxicity is a concern, for instance, in wax coatings for cheeses or as an ingredient in a composition for treating cloth and paper wrapping materials. Glycidol may also be utilized as an ingredient in adhesive compositions.

Obviously, many modifications and variations of the invention as hereinbefore set forth may be made without departing from the spirit and scope thereof, and therefore only such limitations should be imposed as are indicated in the appended claims.

We claim:
1. A process for inhibiting the growth of bacteria and fungi in food products which contain moisture comprising: adding to said food products at least about 0.1% of glycidol based on the weight of said food product.
2. A process for inhibiting the growth of bacteria and fungi in food products which contain moisture comprising: adding to said food products from about 0.05% to about 3% glycidol based on the weight of food product.
3. A process for inhibiting the growth of bacteria and fungi in food products which contain moisture comprising: adding to said food products glycidol dispersed in a suitable carrier, said dispersion containing from about 0.05% to about 3% glycidol based on the weight of food product to be treated.

References Cited in the file of this patent
UNITED STATES PATENTS

| 2,224,849 | Groll | Dec. 17, 1940 |
| 2,667,421 | Parks | Jan. 26, 1954 |

OTHER REFERENCES

"Epoxidation and Hydroxylation," Dupont, A literature view, 1928, page 6.

"Uses and Applications of Chemicals and Related Materials," 1939, by Gregory, published by Reinhold Pub. Co., pp. 300 and 301.